No. 847,142. PATENTED MAR. 12, 1907.
W. WOLF.
ADJUSTABLE CULTIVATOR.
APPLICATION FILED MAY 7, 1906.
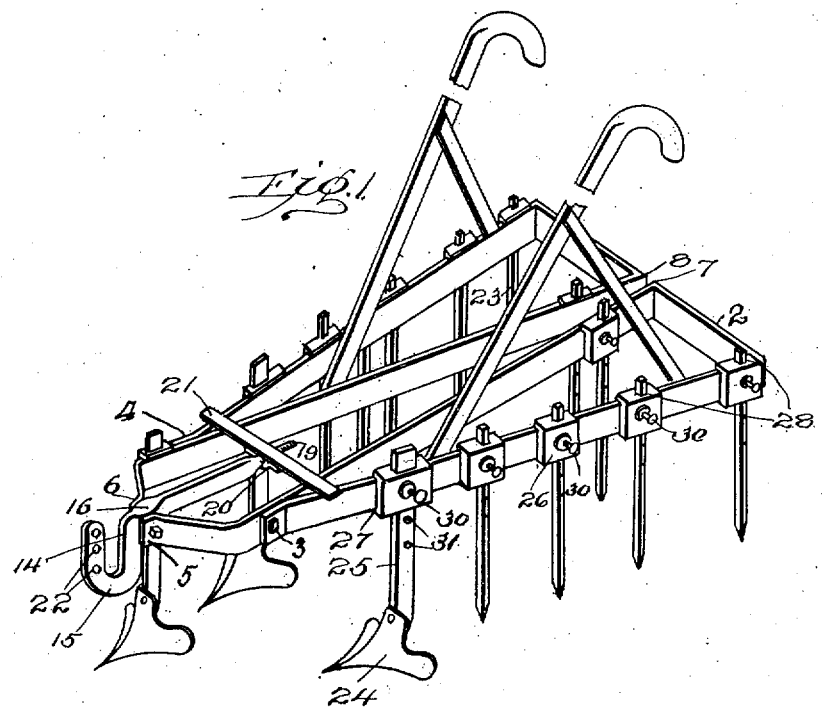
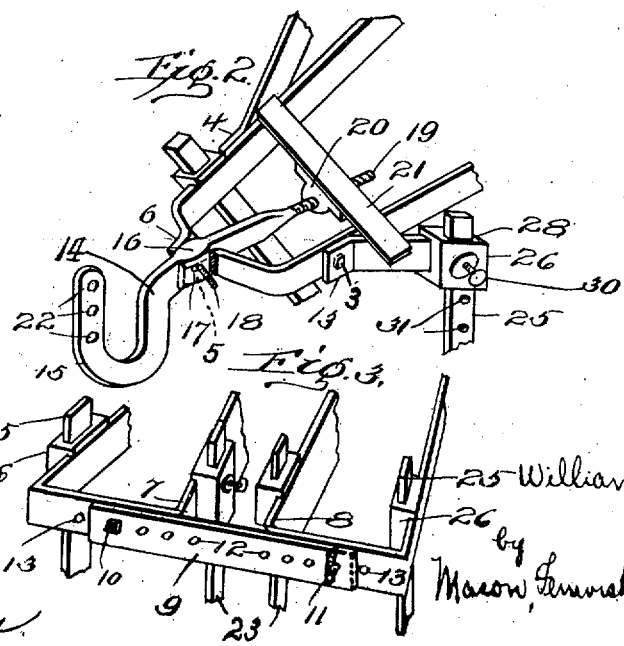

UNITED STATES PATENT OFFICE.

WILLIAM WOLF, OF ENTIAT, WASHINGTON.

ADJUSTABLE CULTIVATOR.

No. 847,142. Specification of Letters Patent. Patented March 12, 1907.

Application filed May 7, 1906. Serial No. 315,657.

*To all whom it may concern:*

Be it known that I, WILLIAM WOLF, a citizen of the United States, residing at Entiat, in the county of Chelan and State of Washington, have invented certain new and useful Improvements in Adjustable Cultivators; and I do hereby declare the following to be a full, clear, and exact description of the invention, such as will enable others skilled in the art to which it appertains to make and use the same.

This invention relates to improvements in a combined harrow and cultivator, and more particularly to a framework especially adapted to be used as a harrow.

The invention comprises the production of a plurality of frames made from any suitable material, preferably from bars of steel bent into the proper shape and secured together at their ends, harrow teeth or shanks for plow-shovels, and means for securing the same to the frame.

It further comprises the production of a peculiar draw-bar which extends only partially the length of the frame and is pivotally secured to one end of the frame in such a manner as to permit the sections of the frame to be separated to a slight degree and elevated as may be desired by means of suitable handles secured to each section.

The object in view is the production of a harrow and cultivator combined that is made in sections, the sections being capable of independent movement, so as to adapt the same to unevenness of the ground, as well as to permit the operator to raise either section at will from the ground to clean the same of weeds and the like.

Another object in view is the production of a harrow and cultivator combined made from bar-iron bent into the proper contour and provided with suitable means for interchangeably securing various forms of plows or teeth to the frame.

With these and other objects in view the invention comprises certain other novel combinations and arrangements of parts, as will be hereinafter more fully described and claimed.

In the accompanying drawings, Figure 1 is a perspective view of my invention, showing various teeth and plow structures secured thereto. Fig. 2 is a detail perspective view of a portion of my invention, showing one of the harrow-sections elevated and the corresponding positions of the draw-bar and yoke when either section is in such raised position. Fig. 3 is a detail perspective view of the rear portion of the harrow embodying the features of my invention, showing a connecting-bar that may be used to hold the various sections apart.

It has been found difficult to produce a harrow that is capable of withstanding the rough usages to which the same is applied without making the harrow of an undesirable weight, and it has also been found desirable to produce harrows that are made in sections and each section, as near as possible, to be under the immediate control of the operator. These objects have been attained with more or less success; and it is among the objects of my invention to produce a harrow and cultivator that will attain the advantage above suggested.

In the embodiments of my invention as shown in the drawings 1 and 2 indicate sections of a harrow-frame made according to my invention. In making these frames I bend a preferably flat bar into the desired shape and secure the same at 3 and 4. From 3 and 4 the bars extend outwardly and are bent into a compound curve, so as to produce securing portions or ends 5 and 6. The ends 5 and 6 are preferably positioned so as to be in a direct line from the corners 7 and 8, so that when the power is applied at the ends 5 and 6 the harrow will be propelled in such a manner as to permit the ends 7 and 8 merely to touch or, if desired, to travel slightly apart. If desired, a bar or link 9 may be pivotally secured to the sections 1 and 2 by suitable bolts 10 and 11 for spacing the sections apart. The bar 9 is provided with any suitable number of apertures, as 12 12, for permitting any desired adjustment of distance between the harrow-sections. If desirable, a number of apertures, as 13 13, may be placed in the harrow-sections to also be used in adjusting the distance between the harrow-sections when the bar 9 is used.

At the forward end of the harrow is provided a draw-bar 14, which has a hook portion 15 provided with any suitable number of apertures for attaching means for propelling the harrow. The draw-bar 14 is swelled or enlarged at 16 and is rounded, so as to permit the ends 5 and 6 to pivot horizontally thereon. An elongated aperture, as 17, is formed in the draw-bar 14 for accommodating a securing-bolt 18, which also projects through the ends 5 and 6 of the harrow-sections. In use the nut on the bolt 18 is preferably not tightened to any great extent, so as to permit the sections 1 and 2 to be pivoted on the enlarged portion 16, and thus allow the sections to be spread or brought together, as may be desired, in order to avoid rocks or other obstructions in the field.

The draw-bar 14 extends only a short distance from the front of the harrow and is reduced in size and threaded, as 19, and is adapted to pass through a yoke 20, secured to a cross-bar 21, which rests upon the front end of the sections 1 and 2. When power is applied to the draw-bar 14, the cross-bar 21 presses upon the sections 1 and 2 to a greater or less extent, according to which of the apertures 22 the power is applied to. By adjusting the power to the various apertures the harrow is forced to a greater or less extent to enter the earth by means of the cross-bar 21 pressing upon the ends of the sections 1 and 2. This pressure is equal, whether one of the sections is raised or not. This is secured by means of the threaded end 19 of the draw-bar 14 being pivotally mounted in the yoke 20, which permits either or both ends of the bar 21 to be raised, but exerts an equal pressure on the ends of the bar 21 regardless of the position of the same.

Secured to the frame 1 and 2 is any suitable number of harrow-teeth 23, or, if desirable, plows may be secured in place of the harrow-teeth 23. I have shown in the drawings both harrow-teeth 23 and plows, as 24, secured to the frames 1 and 2 by means of suitable shanks 25. In order to secure these plow-shanks or harrow-teeth firmly in place, I provide a securing means, as 26, which is preferably made from a block of steel and has a portion removed therefrom, so as to leave a recess 27.

The recess 27 is made of such a size as to fit the bars of the frames 1 and 2. The securing means 26 is also provided with an aperture 28, which may be of any desired contour for accommodating either the square-shaped harrow-teeth 23 or the oblong-shaped shank (in cross-section) 25 of the plow 24. After the securing-blocks 26 have been fastened in position the harrow-teeth or plow-shank is passed through the aperture 28 and is securely held in any desired position by means of a set-screw, as 30. In providing the shanks 25 and the harrow-teeth 23 I preferably form therein a plurality of countersunk portions, as 31, which are placed at a suitable distance apart and are adapted to coincide or register with the set-screw 30. In this way with but small resistance the set-screw may firmly hold the plow-shanks or harrow-teeth in position in the securing device 26. In operation when strain is applied to the harrow-teeth or shank portions of the plows a twisting motion is of course applied to the securing means 26; but as the same partially surrounds one of the bars constituting the frames 1 and 2 the strain is sustained by the block 26 and not by the set-screw 30. From this it will be seen that the function of the set-screw 30 is primarily for holding the shanks of the plows and the harrow-teeth in any desired horizontal plane.

By constructing the harrow of a plurality of sections made from bar-iron bent into the desired shape I produce a plow that is strong and capable of resisting all the usual strains and jars incident to the use of a harrow.

By my construction of harrow I may use a complete set of harrow-teeth, and thus have a simple harrow, or, if desired, I may use plows or simply cultivator-shovels, or may, if desirable, use any combination of these tools for the various work desired. In forming the harrow in sections and pivoting the same to a draw-bar in the manner as above described a harrow is produced that will be easily operated and particularly adapted to harrowing rough soil and bad places in the field, as either of the sections may be moved to one side or raised, as may be desired. This easy manipulation and ready adjustment of the harrow-sections to the unevenness of the soil is of great advantage and one of the main features of this invention.

Having thus fully described my invention, what I claim as new, and desire to secure by Letters Patent, is—

1. In a device of the character described, the combination of a draw-bar, a plurality of frames carrying cultivating members and loosely connected to an intermediate portion of the draw-bar, and a cross-bar loosely connected to the draw-bar and engaging the before-mentioned frames to hold the cultivating members carried thereby to their work.

2. In a device of the character described, the combination of a draw-bar, a plurality of frames loosely connected to an intermediate portion of the draw-bar, and a cross-bar loosely connected to the rear portion of the draw-bar and bearing against the top of the frames whereby the cultivating members carried thereby are held to their work.

3. In a device of the character described, the combination of a draw-bar having one end thereof reduced in cross-section, a plurality of frames carrying cultivating members and loosely connected to an intermediate portion of the draw-bar, a yoke swiveled on the reduced end of the draw-bar, and a cross-bar carried by the yoke and engaging with the frames to hold the cultivating members carried thereby to their work.

4. A harrow comprising a plurality of sections having teeth secured thereto, a draw-bar pivotally secured to said sections, a yoke pivotally mounted on one end of said draw-bar and a bar secured to said yoke for holding the harrow to its work.

5. In a device of the character described, the combination of a draw-bar, a pair of laterally-swinging frames pivotally connected to an intermediate portion of the draw-bar and carrying cultivating members, and a cross-bar loosely connected to the rear portion of the draw-bar and engaging with the frames to hold the cultivating members carried thereby to their work.

6. The combination of a draw-bar provided with a laterally-enlarged portion and having a laterally-disposed aperture passing through the said enlarged portion, a pin disposed within the aperture, and frames connected to opposite ends of the pin and pivoted upon the said enlarged portion so as to swing laterally.

In testimony whereof I affix my signature in presence of two witnesses.

WILLIAM WOLF.

Witnesses:
G. WARD KEMP,
MARK WHELAN.